United States Patent
Kubena

(10) Patent No.: US 9,038,459 B1
(45) Date of Patent: May 26, 2015

(54) FREQUENCY LOCKING OF RESONATORS FOR IMPROVED TEMPERATURE CONTROL OF GYROSCOPES

(75) Inventor: Randall L. Kubena, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 432 days.

(21) Appl. No.: 13/405,658

(22) Filed: Feb. 27, 2012

Related U.S. Application Data

(63) Continuation-in-part of application No. 12/636,931, filed on Dec. 14, 2009, now Pat. No. 8,402,824.

(51) Int. Cl.
*G01C 19/56* (2012.01)

(52) U.S. Cl.
CPC ...................... *G01C 19/56* (2013.01)

(58) Field of Classification Search
CPC ........... G01C 19/5614; G01C 19/5783; G01C 19/662
USPC .................. 73/1.77, 504.02, 504.04; 74/5.6 D
See application file for complete search history.

(56) References Cited

U.S. PATENT DOCUMENTS

| | | | | |
|---|---|---|---|---|
| 5,783,973 | A * | 7/1998 | Weinberg et al. | 331/35 |
| 6,742,389 | B2 * | 6/2004 | Nguyen et al. | 73/504.12 |
| 7,224,236 | B2 * | 5/2007 | Partridge et al. | 331/66 |
| 7,237,169 | B2 * | 6/2007 | Smith | 714/742 |
| 7,446,461 | B2 | 11/2008 | Watanabe | |
| 7,459,099 | B2 | 12/2008 | Kubena et al. | |
| 8,151,640 | B1 | 4/2012 | Kubena | |
| 8,402,824 | B1 | 3/2013 | Kubena | |
| 8,766,745 | B1 | 7/2014 | Kubena et al. | |
| 2001/0040154 | A1 * | 11/2001 | Hashimoto et al. | 219/210 |
| 2008/0203081 | A1 * | 8/2008 | Eickhoff et al. | 219/385 |
| 2008/0257041 | A1 * | 10/2008 | Datskos | 73/504.02 |

OTHER PUBLICATIONS

Author: Fritz Riehle, Title: Frequency Standards, Basics and Applications, Date: 2004, Publisher: WILEY-VCH Verlag GmbH & Co., pp. Title page, Bibliographic page and 81-116.*

U.S. Appl. No. 12/636,931, filed Dec. 14, 2009, Kubena.

Notice of Allowance dated Nov. 23, 2013 for U.S. Appl. No. 12/636,931 (now published as U.S. 8,402,824).

Non-Final Office Action dated Sep. 4, 2013 for U.S. Appl. No. 12/636,931 (now published as U.S. 8,402,824).

* cited by examiner

*Primary Examiner* — Harshad R Patel

(74) *Attorney, Agent, or Firm* — Ladas & Parry

(57) ABSTRACT

A precision gyroscope includes a gyroscope, means for receiving an external clock reference, and circuitry coupled to the means for receiving the external clock reference and adapted for stabilizing a temperature and a frequency of the gyroscope.

24 Claims, 5 Drawing Sheets

FREQUENCY LOCKING OF RESONATORS FOR IMPROVED TEMPERATURE CONTROL OF GYROSCOPES

CROSS REFERENCE TO RELATED APPLICATION

This is a continuation in part application of U.S. patent application Ser. No. 12/636,931, filed on Dec. 14, 2009, which is incorporated herein as though set forth in full.

FIELD

This disclosure relates to the stability of gyroscopes, and more particularly to temperature and frequency control of disk resonator gyroscopes.

BACKGROUND

One of the principal error sources for a gyroscope is bias instability due to temperature fluctuations. In particular, most of the long term drift in the bias stability of present gyroscopes is believed to be due to slow temperature drifts in the gyroscope packaging.

For expensive gyroscopes, temperature compensation and/or ovenization are utilized to correct and/or control the temperature of the gyroscope. However, the prior art temperature compensated and/or oversized gyroscopes have required large modules having several cubic inches of volume. These prior art modules also consumed several watts of power. These factors increase the cost and limit the applications for which these expensive gyroscopes can be used.

For low cost MEMS (micro-electro-mechanical system) gyroscopes, temperature control has not been commercially utilized. However, the result is less than sufficient bias stability and therefore less accuracy for navigational grade gyroscopes. Research at the University of Michigan has demonstrated on-chip ovenization of gyroscopes under a DARPA program named HERMIT. This prior art uses simple Si (silicon) based thermistors to detect temperature fluctuations near the gyroscope in order to correct and/or control the temperature of the gyroscope. However, Si thermistors have accuracies in the 10-100 mK range, and because a Si disk resonator gyroscope (DRG) has a predicted bias drift sensitivity of $10°/hr/°$ C., controlling the temperature to within 10 mK yields a bias stability of $0.1°/hr$, which is not a sufficient stability for many applications.

The need for low cost gyroscopes is increasing due to many expanding applications including micro UAVs, satellites, and handheld GPS (global positioning satellite) systems. A particular need for low cost gyroscopes with both military and commercial applications is for personal tracking systems, which are becoming more common.

What is needed is a low cost gyroscope with low volume and power requirements. Also needed is a low cost gyroscope with improved bias stability. The embodiments of the present disclosure answer these and other needs.

SUMMARY

In a first embodiment disclosed herein, a precision gyroscope comprises a semiconductor substrate, a gyroscope integrated on the substrate, and a quartz resonator clock integrated on the substrate.

In another embodiment disclosed herein, a precision gyroscope comprises a quartz substrate, a gyroscope integrated on the substrate, and a quartz resonator integrated on the substrate.

In yet another embodiment disclosed herein, a precision gyroscope comprises a gyroscope, means for receiving an external clock reference, and circuitry coupled to the means for receiving the external clock reference and adapted for stabilizing a temperature and a frequency of the gyroscope.

In still another embodiment disclosed herein, a precision gyroscope comprises a gyroscope, an external clock reference, and circuitry coupled to the external clock reference and adapted for stabilizing a temperature and a frequency of the gyroscope.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
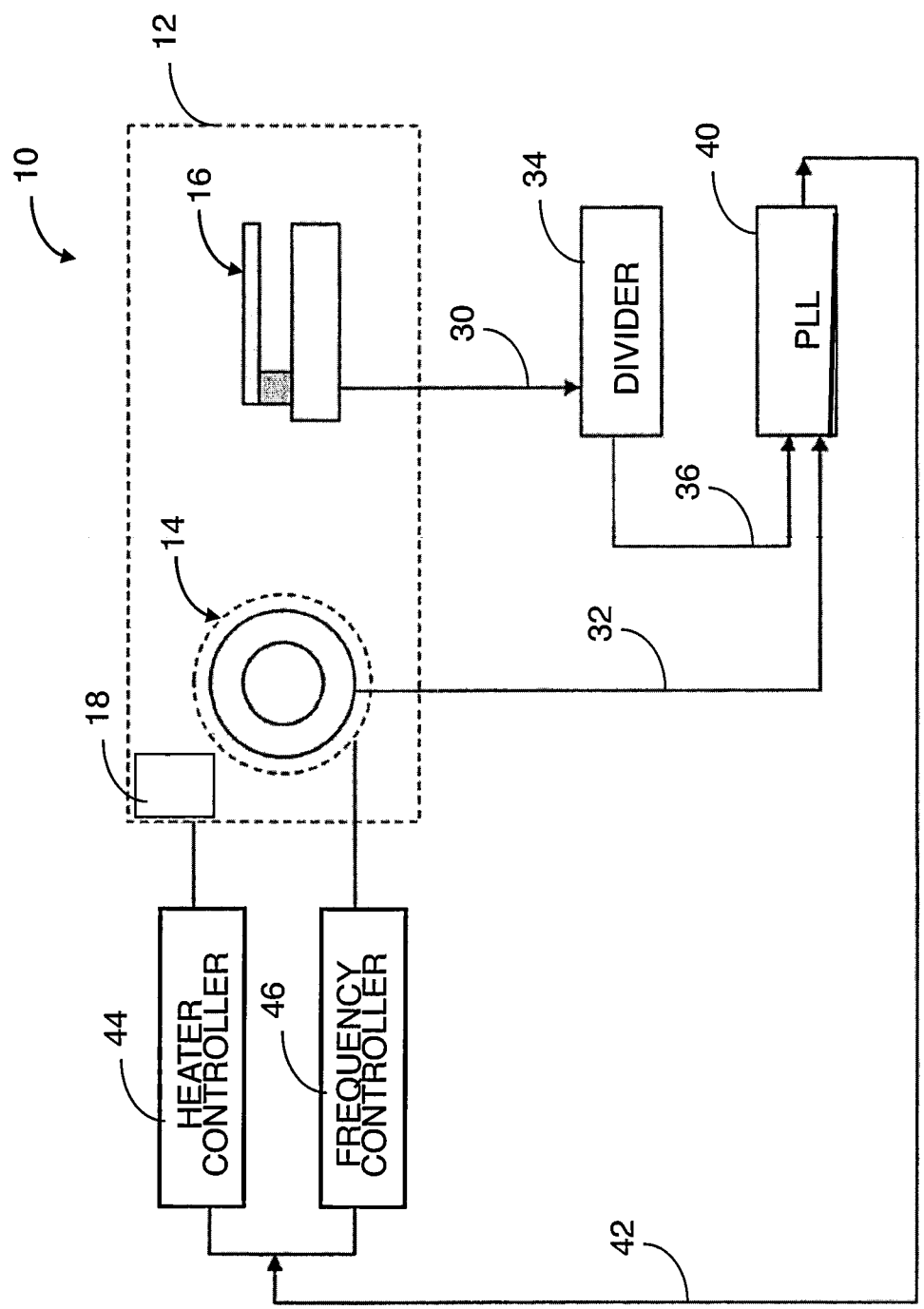
FIG. 1 shows a gyroscope integrated with a quartz resonator clock on a common semiconductor or quartz substrate and a control loop for stabilizing the gyroscope in accordance with the present disclosure.

Referring to FIG. 1, a block diagram 10 is shown of a gyroscope 14 integrated with a quartz resonator clock 16 on a common substrate 12 in accordance with the present disclosure. A control loop for stabilizing the gyroscope is also shown and may include a divider 34, a phase-locked loop 40, a heater controller 44, and a frequency controller 46. The gyroscope 14 may be a MEMS disk resonator gyroscope. Such a MEMS disk resonator gyroscope is described in U.S. patent application Ser. No. 12/488,784, filed on Jun. 22, 2009 by Kubena et al., which is incorporated herein as though set forth in full. A quartz resonator representative of quartz resonator clock 16 is described in U.S. Pat. No. 7,459,099 to Kubena et al., which is incorporated herein as though set forth in full.

Figure 2:
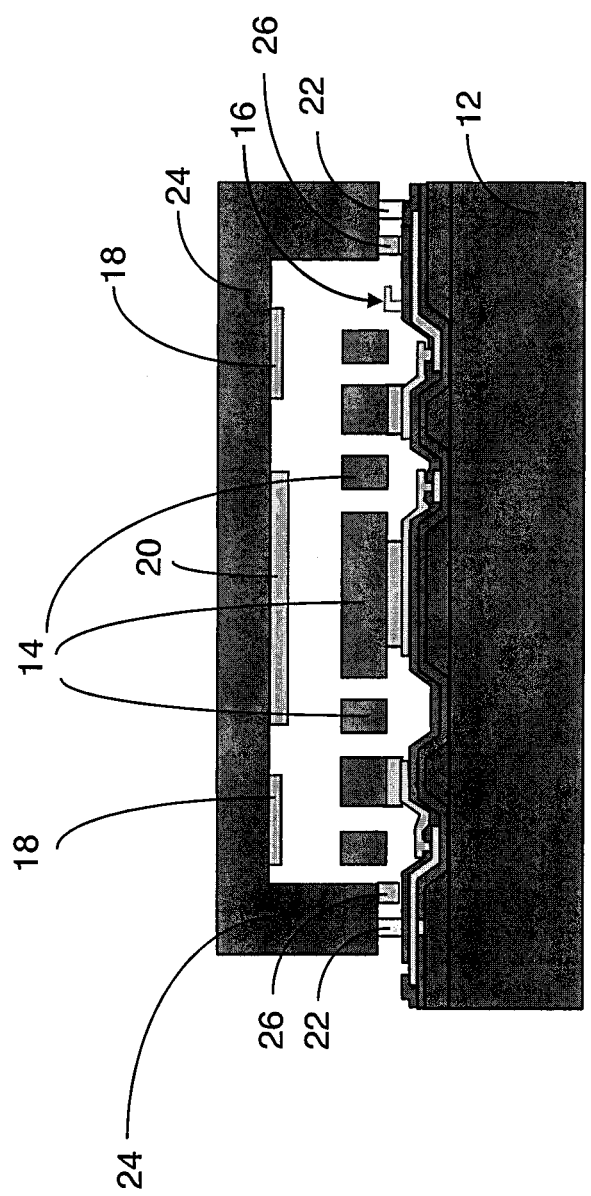
FIG. 2 shows an embodiment of an integrated gyroscope and quartz resonator clock on a common substrate in accordance with the present disclosure.

One or more heaters 18 may also be integrated on the substrate 12 or located on a vacuum cap 24 over the substrate 12, as shown in FIG. 2. The heater 18 may also be on other packaging (not shown) for the common substrate 12.

By tuning the frequency of the quartz resonator clock 16, either mechanically or electronically, to be a simple multiple of the frequency of the gyroscope 14, the frequency output 30 of the quartz resonator clock 16 can be divided by divider 34 and the resulting signal 36 used as a reference frequency in a phase-locked loop 40 to phase lock with the frequency signal 32 from the gyroscope 14. The quartz resonator clock 16 is connected to the appropriate electronic circuitry (not shown) to produce a continuous clock output. The electronic circuitry can be located on the semiconductor substrate or in an adjacent integrated circuit. The divider 34 can be an analog or a digital divider with reference timing supplied by the quartz clock. Any offset in the divider may be compensated by electronic tuning of the gyroscope 14 or the quartz resonator clock 16.

The phase-locked loop output 42 may be used to control and stabilize the frequency of the gyroscope 14 by controlling the temperature of the gyroscope 14 via the heater controller 44, which controls the temperature of heater 18. Alternatively, or in addition, the frequency of the gyroscope 14 can be controlled and stabilized for higher frequency modulation by using the phase-locked loop output 42 and frequency controller 46 to electronically bias a voltage in the gyroscope 14 to stabilize the gyroscope frequency.

FIG. 2 shows an embodiment of an integrated gyroscope 14 and quartz resonator clock 16 integrated onto a common substrate 12 in accordance with the present disclosure. The substrate 12 may be a semiconductor such as silicon (Si), silicon germanium (SiGe), gallium arsenide (GaAs) or indium phosphide (InP). In another embodiment the substrate 12 may be quartz. The gyroscope 14 and the quartz resonator clock 16 may be enclosed on the substrate 12 by vacuum cap 24 connected to substrate 12 by seal ring 22. A getter 20 may be included on the vacuum cap 24.

As shown in FIG. 2, one or more heaters 18 may be mounted on or inside the vacuum cap 24 and connected to heater controller 44, as shown in FIG. 1, by interconnect metal (not shown) running down the inside of the vacuum cap 24 to heater interconnect pads 26. The result is an oversized housing implemented with substrate or wafer-level integration as shown in FIG. 2.

The following is one nonlimiting example of the operation of the integrated gyroscope 14 and quartz resonator clock 16 with the control loop. For example, it will be understood by those skilled in the art that the frequencies in this example can be changed to other frequencies.

If the gyroscope 14 is assumed to have an operating frequency of 15 kHz, the quartz resonator clock 16 frequency may be selected to be 15 MHz, which is a 1000 times multiple of 15 kHz. The frequency of the quartz resonator clock 16 may be initially adjusted using mechanical tuning to parts per billion (ppb) precision and can be electronically tuned to parts per million (ppm) as well. Then the operating frequency of the gyroscope 14 can be initially electronically tuned to an exact multiple of the quartz resonator clock 16 frequency by frequency controller 46. The quartz resonator clock 16 frequency 30 is divided by the required amount ($1000=10^3$ in this example) by divider 34 to be equal to the 15 kHz frequency of the gyroscope 14 to ppm accuracy. The resulting signal 36 is then used as the reference to the phase-locked loop 40, which also receives the frequency signal 32 output from the gyroscope 14. A phase adjustment between the frequency signal 32 and signal 36 may also be performed.

The output error signal 42 of the phase-locked loop 40 is used to control the temperature of the heater 18 via heater controller 44 in order to adjust and stabilize the temperature and hence the frequency of the gyroscope 14. Alternatively, or in addition, the output 42 of the phase-locked loop 40 may be used to electronically control the gyroscope 14 frequency via frequency controller 46, which adjusts a bias voltage in the gyroscope 14. This may be needed for example when the gyroscope frequency varies rapidly in response to an external vibration.

The time constant for the heater controller 44 may be set to be much larger than the time constant for the frequency controller 46. For example, the time constant of the frequency controller 46 can be set to allow variations faster than a few seconds while the time constant of the heater controller 44 may be set to respond to variations much slower than a few seconds. These thermal time constants may also be adjusted based on the thermal mass and conductivity of the packaging.

The frequency of the gyroscope 14 is much more sensitive to temperature changes than is the frequency of the quartz resonator clock 16 to those same temperature changes, particularly for SC-cut quartz resonators. For example, Si gyroscopes typically have much higher frequency sensitivities to temperature, on the order of 30 ppm/° C., compared to quartz resonators, which have a much lower frequency sensitivity of $4.0 \times 10^{-8}$/° C., or 0.04 ppm/° C., for non-oversized SC-cut quartz. For an oversized SC-cut quartz resonator the frequency sensitivity is improved to $10^{-11}$/° C., or 0.01 parts per billion (ppb)/° C. Thus, a quartz resonator clock 16 or crystal oscillator can be used to stabilize the frequency of the gyroscope 14 by comparing the frequency drift between the gyroscope 14 and the quartz resonator clock 16 over long (several second) time constants. The phase-locked loop 40 compares the frequencies of the divided quartz resonator clock 16 frequency and the gyroscope 14 frequency and produces an error signal on phase-locked loop output 42 which is proportional to the difference between the two input frequencies.

It is well known that a high quality phase-locked loop 40 can control the frequency of a source, such as gyroscope 14, approximately $10^3$ times better than the frequency uncertainty inherent in the source's Q, which is a measure of the quality and frequency smear of a resonator. This is due to the fact that the phase shift of the resonator changes rapidly near the resonance. Thus, a gyroscope 14 with a Q of $10^5$, can be controlled to a level of approximately $10^8$, which allows frequency control of the gyroscope 14 to tens of parts per billion (ppb) level. For a gyroscope 14 with a Q of greater than $10^6$, sub-ppb control is possible. This technique is similar to that used for high frequency timing sources where a higher frequency, but noisier source, is stabilized using a lower more stable frequency reference.

A thermistor 61 may be electrically coupled to the quartz resonator clock 16 and located within the enclosed housing formed by the substrate 12, vacuum cap 24, and seal ring 22 may be used to control the frequency stability of the quartz resonator clock 16, because a SC-cut quartz resonator clock 16 can be controlled to a fractional frequency stability of roughly $4.0 \times 10^{-10}$ with a thermistor which is stable to 10 mK. This translates to a frequency control of a 15 kHz gyroscope 14 of $6 \times 10^{-6}$ Hz ($4.0 \times 10^{-10} \times 15$ kHz) or $13 \times 10^{-6\circ}$ C. for a 30 ppm/° C. fractional frequency stability of the gyroscope 14 ($4.0 \times 10^{-10}/30 \times 10^{-6}$/° C.). Thus, controlling the gyroscope frequency to a stability of $4.0 \times 10^{-10}$ by locking the frequency of the gyroscope 14 to the much more stable reference frequency from the quartz resonator clock 16 allows the bias stability of the gyroscope 14 to be controlled to 0.00013°/hr ($13 \times 10^{-6\circ}$ C.$\times 10$°/hr/° C.), which is about three orders of magnitude better than the prior art bias stability of 0.1°/hr. Aging also can affect stability and ideally various aging mechanisms are also controlled to this level.

The volume inside of the resulting ovenized housing is quite small and can be less than 5 cubic millimeters, which is several orders of magnitude smaller than the prior art, which as discussed above requires volumes of approximately two cubic inches.

The result is a stable gyroscope with low volume and cost, which allows use of precision gyroscopes in many new applications.

Obviously, an on-chip ovenized oscillator can also be used for the clock of an integrated GPS/INS system. Thus, for a system consisting of inertial sensors and GPS, the ovenized oscillator can serve multiple roles for highly accurate timing on chip.

In an alternate embodiment the gyroscope 14 may be frequency locked to an external clock reference 60 with similar or better temperature stability than an integrated quartz clock. While this embodiment does not provide the same small size, fast warm-up times, and low power that an integrated system, as described above has, the gyro bias stability may still be improved by this embodiment. The external clock reference 60 with a highly stable frequency may be an atomic clock or other ovenized clock.

Figure 3:
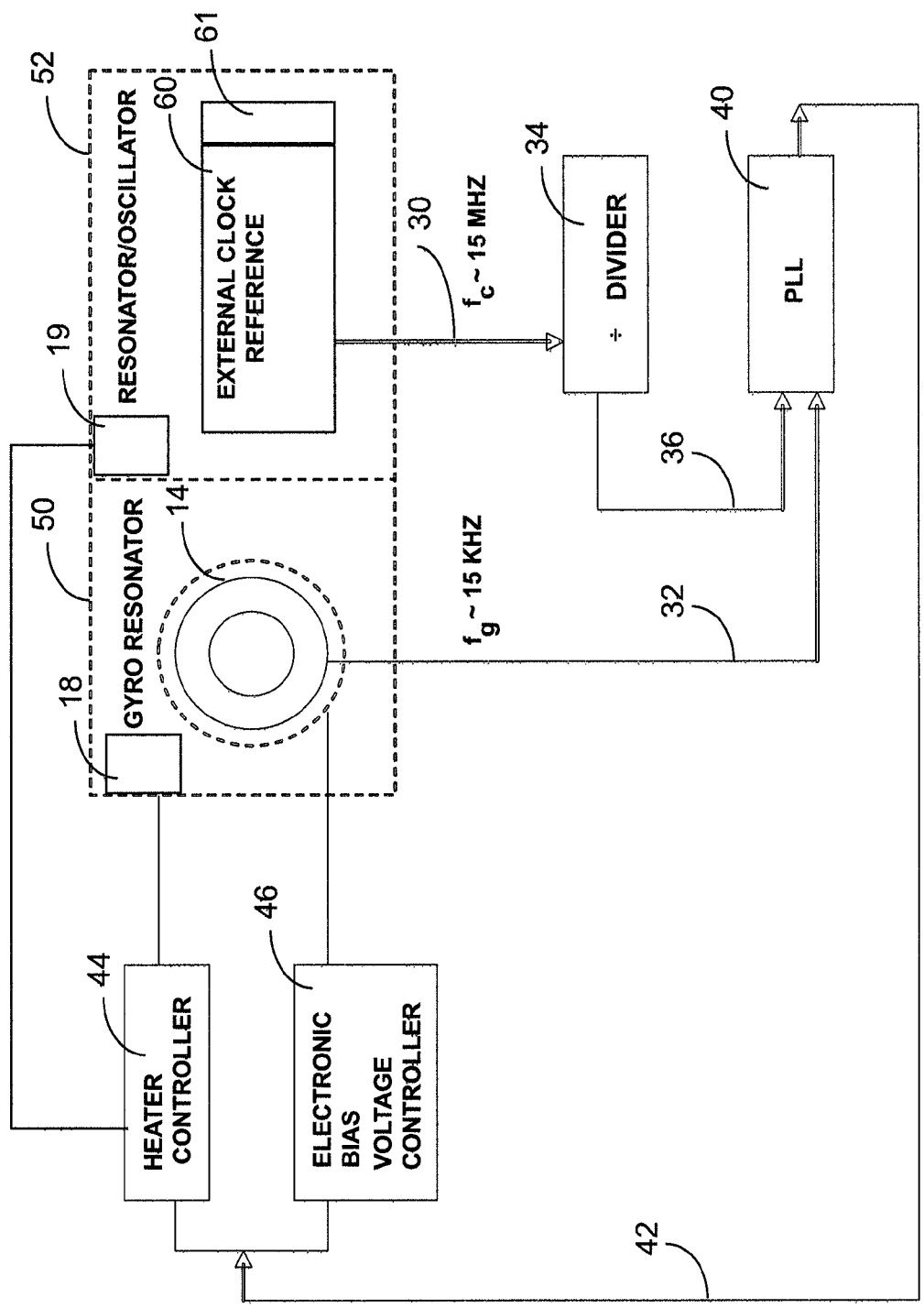
FIG. 3 shows a gyroscope integrated with a control loop for stabilizing the gyroscope in accordance with the present disclosure.
Figure 4:
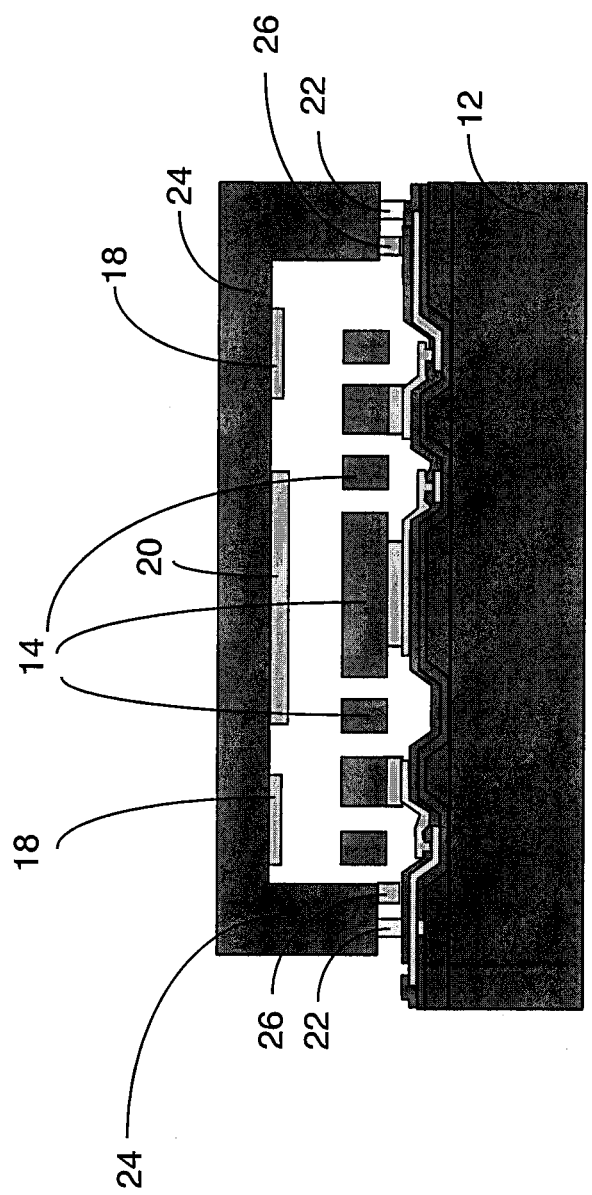
FIG. 4 shows another embodiment of a gyroscope integrated on a substrate.
Figure 5:
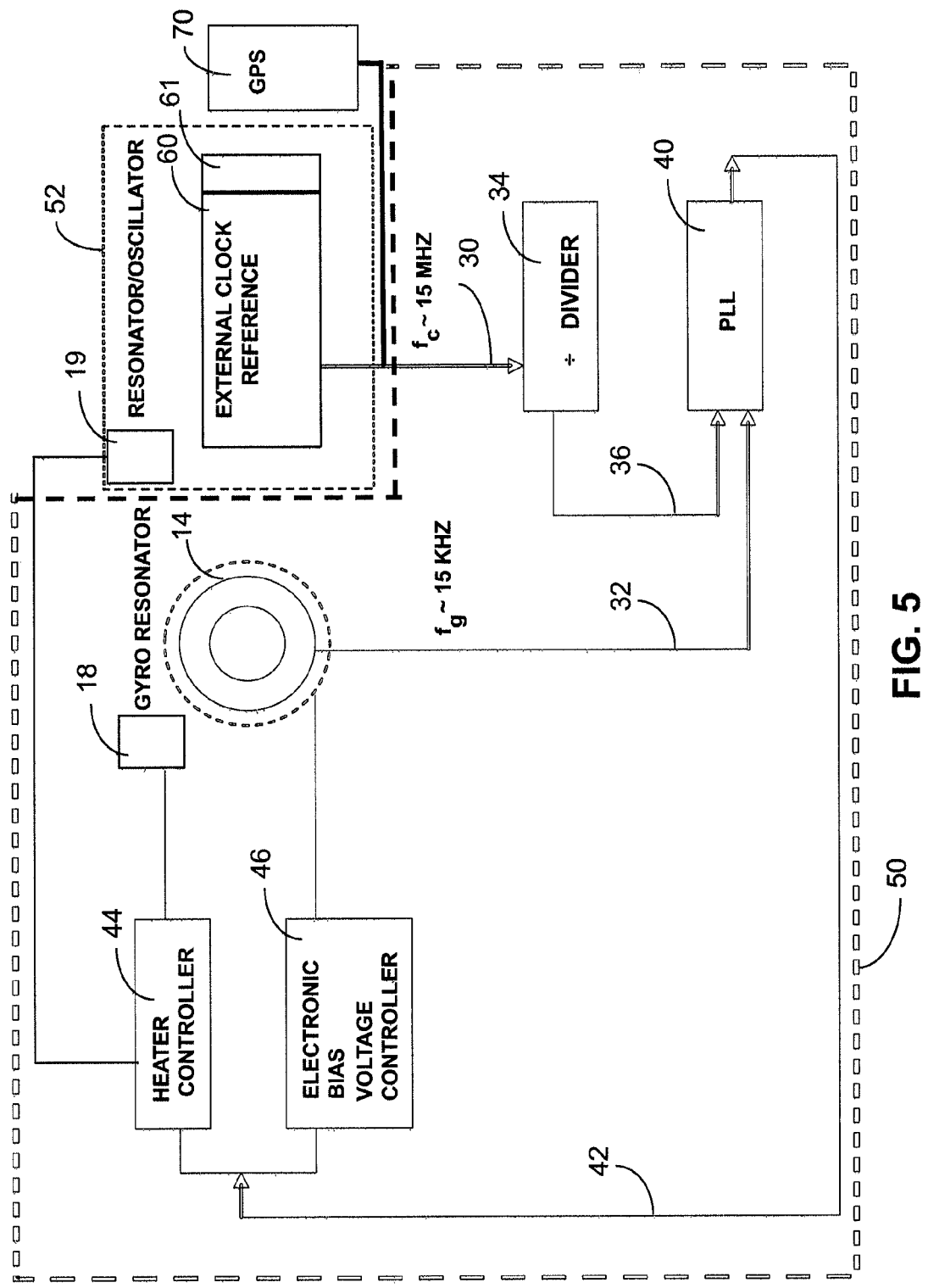
FIG. 5 shows yet another embodiment of a gyroscope in accordance with the present disclosure.

In this embodiment the external clock reference 60 may be in the same housing or in a separate housing from the gyroscope 14. FIG. 3 shows such an embodiment with separate housings 50 and 52. In this embodiment the gyroscope 14 and the control loop may be housed in housing 50, as shown in FIG. 5, or on a substrate 12, as shown in FIG. 4, and the external clock reference 60, such as an atomic clock or an ovenized clock may be housed in separate housing 52. As discussed above, a separate housing 52 for the external clock reference 60 may have a larger size and possibly higher power than an integrated system; however, the gyro bias stability may be improved.

The operation and circuitry of the phase-locked loop 40 described above with reference to FIG. 1 applies as well to the embodiment of FIG. 3. The phase-locked loop circuitry is coupled to and has circuitry for receiving the external clock reference output 30 from the external clock reference 60. By tuning the frequency of the external clock reference 60 to be a simple multiple of the frequency of the gyroscope 14, the frequency output 30 of the external clock reference can be divided by divider 34 and the resulting signal 36 used as a reference frequency in a phase-locked loop 40 to phase lock with the frequency signal 32 from the gyroscope 14. The divider 34 can be an analog or a digital divider. Any offset in the divider may be compensated by electronic tuning of the gyroscope 14 or the external clock reference 60.

The phase-locked loop output 42 may be used to control and stabilize the frequency of the gyroscope 14 by controlling the temperature of the gyroscope 14 via the heater controller 44 to control the temperature of heater 18 for the gyroscope 14 and the heater 19 in housing 52 for the external clock reference 60. A thermistor 61 may also be electrically coupled to the external clock reference 60, and located within the housing 52 for the purpose of controlling the ovenized temperature within the housing 52, and thereby the frequency stability of the external clock reference 60.

In this embodiment, as described above, the frequency of the gyroscope 14 can also be controlled and stabilized for higher frequency modulation by using the phase-locked loop output 42 and frequency controller 46 to electronically bias a voltage in the gyroscope 14 to stabilize the gyroscope frequency.

The phase-locked loop 42 described above may also have other implementations, such as digital implementations, and may include using the clock reference for the timing standard within a digital servo loop of the gyro. The clock reference 60 may be used as a timing source for any other electronic circuit, which may be a global positioning system 70, as shown in FIG. 5.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A precision gyroscope comprising:
    a gyroscope, wherein the gyroscope has a frequency;
    a clock reference, wherein the clock reference has a frequency; and
    circuitry coupled to the clock reference and to the gyroscope, the circuitry configured for stabilizing a temperature and the frequency of the gyroscope;
    wherein the frequency of the clock reference is a simple multiple greater than 1 of the frequency of the gyroscope.

2. The precision gyroscope of claim 1:
    wherein the gyroscope and the circuitry are in a first housing or on a semiconductor substrate; and
    wherein the semiconductor substrate comprises silicon (Si), silicon germanium (SiGe), gallium arsenide (GaAs), or indium phosphide (InP).

3. The precision gyroscope of claim 1 wherein the gyroscope and the clock reference share a common temperature controlled housing, or wherein the gyroscope and the clock reference are in separate temperature controlled housings.

4. The precision gyroscope of claim 1 wherein the gyroscope is a vibrating mode gyroscope.

5. The precision gyroscope of claim 1 wherein the gyroscope is a disk resonator gyroscope.

6. The precision gyroscope of claim 1 wherein the circuitry further comprises a feedback loop coupled to the gyroscope and the clock reference for stabilizing the temperature and frequency of the gyroscope.

7. The precision gyroscope of claim 6 wherein the feedback loop comprises a phase-locked loop.

8. The precision gyroscope of claim 6 wherein the feedback loop is coupled to a frequency controller to electronically bias a voltage in the gyroscope.

9. The precision gyroscope of claim 6 wherein the feedback loop is coupled to a heater for controlling a temperature of the gyroscope.

10. The precision gyroscope of claim 9:
wherein the heater is mounted on a substrate on which the gyroscope is mounted; or
wherein the heater is mounted on a cap enclosing the gyroscope on the substrate.

11. The precision gyroscope of claim 6:
wherein the gyroscope and the clock reference are in separate temperature controlled housings;
wherein the feedback loop is coupled to a first heater for controlling a temperature of the gyroscope; and
wherein the feedback loop is coupled to a second heater for controlling a temperature of the clock reference.

12. The precision gyroscope of claim 1:
wherein the clock reference comprises a quartz resonator clock; and
further comprising:
a thermistor coupled to the quartz resonator clock for stabilizing a frequency of the quartz resonator clock.

13. The precision gyroscope of claim 12 wherein the quartz resonator clock comprises an SC-cut crystal resonator.

14. The precision gyroscope of claim 1:
wherein the clock reference comprises an atomic clock.

15. The precision gyroscope of claim 1 further comprising:
an electronic circuit;
wherein the clock reference is a timing source for the electronic circuit.

16. The precision gyroscope of claim 1 further comprising:
a global positioning system; and
wherein the clock reference is a timing source for the global positioning system.

17. The precision gyroscope of claim 1:
wherein the gyroscope and the circuitry are in a first housing or on a semiconductor substrate; and
wherein the clock reference is in a second housing.

18. The precision gyroscope of claim 1 wherein the circuitry comprises:
a divider connected to the clock reference, the divider having an output that has a divided frequency of the frequency of the clock reference; and
a phase lock loop having a first input connected to the output of the divider and a second input connected to the frequency of the gyroscope, and having a phase lock loop output configured for stabilizing a temperature and the frequency of the gyroscope.

19. The precision gyroscope of claim 18:
wherein the phase lock loop output is coupled to a frequency controller for controlling the frequency of the gyroscope; and
wherein the phase lock loop output is coupled to a heater for controlling a temperature of the gyroscope.

20. A precision gyroscope comprising:
a gyroscope, wherein the gyroscope has a frequency;
an external clock reference, wherein the external clock reference has a frequency; and
circuitry coupled to the external clock reference and to the gyroscope, the circuitry configured for stabilizing a temperature and a frequency of the gyroscope;
wherein the frequency of the external clock reference is a simple multiple greater than 1 of the frequency of the gyroscope.

21. The precision gyroscope of claim 20 wherein the gyroscope is a disk resonator gyroscope.

22. The precision gyroscope of claim 20 the circuitry comprises:
a feedback loop coupled to the gyroscope and the external clock reference for stabilizing the temperature and frequency of the gyroscope; and
wherein the feedback loop comprises a phase-locked loop.

23. The precision gyroscope of claim 20 wherein the circuitry comprises:
a divider connected to the external clock reference, the divider having an output that has a divided frequency of the frequency of the external clock reference; and
a phase lock loop having a first input connected to the output of the divider and a second input connected to the frequency of the gyroscope, and having a phase lock loop output configured for stabilizing a temperature and the frequency of the gyroscope.

24. The precision gyroscope of claim 23:
wherein the phase lock loop output is coupled to a frequency controller for controlling the frequency of the gyroscope; and
wherein the phase lock loop output is coupled to a heater for controlling a temperature of the gyroscope.

* * * * *